(12) United States Patent
Hada et al.

(10) Patent No.: US 9,753,056 B2
(45) Date of Patent: Sep. 5, 2017

(54) ACCELERATION SENSOR

(71) Applicant: Murata Manufacturing Co., Ltd., Nagaokakyo-shi, Kyoto-fu (JP)

(72) Inventors: Takuo Hada, Nagaokakyo (JP); Katsumi Fujimoto, Nagaokakyo (JP); Hideya Horiuchi, Nagaokakyo (JP); Toshimaro Yoneda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 445 days.

(21) Appl. No.: 14/501,109

(22) Filed: Sep. 30, 2014

(65) Prior Publication Data

US 2015/0013457 A1    Jan. 15, 2015

Related U.S. Application Data

(63) Continuation of application No. PCT/JP2013/061149, filed on Apr. 15, 2013.

(30) Foreign Application Priority Data

Apr. 27, 2012  (JP) .................................. 2012-102844

(51) Int. Cl.
  *G01P 15/097*  (2006.01)
  *G01P 15/09*  (2006.01)
  (Continued)

(52) U.S. Cl.
  CPC ............ *G01P 15/097* (2013.01); *G01P 15/09* (2013.01); *G01P 15/10* (2013.01); *G01P 2015/0814* (2013.01)

(58) Field of Classification Search
  CPC ......... G01P 15/09; G01P 15/097; G01P 15/10
  See application file for complete search history.

(56) References Cited

U.S. PATENT DOCUMENTS 4,785,215 A * 11/1988 Blech .................... G01P 15/097
                                                                 310/323.21
2006/0236763 A1    10/2006 Terada et al.
(Continued)

FOREIGN PATENT DOCUMENTS

JP    53-132988 A    11/1978
JP    9-257830 A    10/1997
(Continued)

OTHER PUBLICATIONS

Official Communication issued in International Patent Application No. PCT/JP2013/061149, mailed on Jun. 25, 2013.

*Primary Examiner* — Helen Kwok
(74) *Attorney, Agent, or Firm* — Keating & Bennett, LLP

(57) ABSTRACT

A weight member includes two sides opposite to each other in an X-axis direction when looked at in a plan view. A vibrating beam includes one end portion connected at one location to a fixation member and the other end portion connected at one location to one of the two sides of the weight member in the X-axis direction when looked at in a plan view. The vibrating beam supports the weight member to be displaceable in the X-axis direction. A holding beam includes one end portion connected at one location to the fixation member and the other end portion connected at one location to the other of the two sides of the weight member opposing to each other in the X-axis direction when looked at in a plan view. The holding beam supports the weight member to be displaceable in the X-axis direction. A driver is disposed on the vibrating beam and vibrates the vibrating beam. A detector is disposed on the vibrating beam and configured to output a detection signal changes according to deformation of the vibrating beam.

15 Claims, 11 Drawing Sheets

(51) Int. Cl.
*G01P 15/10* (2006.01)
*G01P 15/08* (2006.01)

(56) References Cited

U.S. PATENT DOCUMENTS

| | | | |
|---|---|---|---|
| 2008/0223132 A1* | 9/2008 | Terada | G01P 15/09 73/514.34 |
| 2009/0322183 A1* | 12/2009 | Kawakubo | G01C 19/5621 310/329 |
| 2011/0032590 A1 | 2/2011 | Terada et al. | |
| 2011/0174075 A1* | 7/2011 | Watanabe | G01P 15/097 73/514.34 |
| 2011/0296918 A1* | 12/2011 | Yao | G01P 15/0802 73/514.34 |
| 2015/0013456 A1* | 1/2015 | Hada | G01P 15/09 73/514.29 |

FOREIGN PATENT DOCUMENTS

| | | |
|---|---|---|
| JP | 2006-105764 A | 4/2006 |
| JP | 2006-308291 A | 11/2006 |
| JP | 2009-265362 A | 11/2009 |
| WO | 2010/143675 A1 | 12/2010 |

* cited by examiner

ACCELERATION SENSOR

BACKGROUND OF THE INVENTION

1. Field of the Invention

The present invention relates to an acceleration sensor configured to detect, in a state where a weight member is connected to a vibrating portion and the vibrating portion is vibrated at a resonant frequency of a natural vibration thereof, a magnitude of acceleration from a change in the resonant frequency of the natural vibration of the vibrating portion, which change is generated upon application of acceleration to the weight member.

2. Description of the Related Art

Examples of structures of related-art acceleration sensors will be described below. An acceleration sensor according to a first related art (see, e.g., Japanese Unexamined Patent Application Publication No. 2006-308291) includes an acceleration sensor device 101 and a control circuit (not illustrated). FIG. 10A is a plan view, looking at an X-Y plane, of the acceleration sensor device 101 that constitutes the acceleration sensor according to the first related art. The acceleration sensor device 101 includes a frame 102, holding members 103A, 103B and 103C, a support member 104, and a vibrating plate 105. In the following description, an axis extending in the lengthwise direction of the vibrating plate 105 of the acceleration sensor device 101 is defined as an X-axis of an orthogonal coordinate system, an axis extending in the direction normal to the vibrating plate 105 (i.e., the direction of thickness thereof) is defined as a Z-axis of the orthogonal coordinate system, and an axis being perpendicular to the X-axis and the Z-axis is defined as a Y-axis of the orthogonal coordinate system.

The frame 102 has a frame-like shape. The holding members 103A, 103B and 103C, the support member 104, and the vibrating plate 105 are arranged inside the frame. Led-out electrodes 116A and 116B are disposed on the frame 102. The frame 102 holds the holding members 103A, 103B and 103C, and the vibrating plate 105. The holding members 103A, 103B and 103C hold the support member 104. The support member 104 supports the vibrating plate 105 in cooperation with the frame 102. The support member 104 functions as a weight member.

The vibrating plate 105 is in the form of a beam. The vibrating plate 105 is connected to the frame 102 at a base portion 106A thereof, i.e., at one end portion of the vibrating plate 105 in the X-axis direction, and is connected to the support member 104 at a base portion 106B thereof, i.e., at the other end portion of the vibrating plate 105 in the X-axis direction.

The support member 104 is connected to the frame 102 through the holding members 103A, 103B and 103C. In more detail, the support member 104 is supported by the frame 102 through the holding members 103A, 103B and 103C at two positions on the left side and at one position on the right side when viewed in the drawing sheet of FIG. 10A. Each of the holding members 103A, 103B and 103C is in the form of a beam and has a spring structure (meander structure) in which the beam is folded several times in a zigzag manner alternately in opposite directions with respect to the X-axis direction. Thus, the support member 104 is supported to be reciprocally movable only in the X-axis direction.

FIG. 10B is a perspective view illustrating, in enlarged scale, the vibrating plate 105 of the acceleration sensor device 101 that constitutes the acceleration sensor according to the first related art. The vibrating plate 105 is constituted by a silicon (Si) layer 112 formed on a silicon dioxide ($SiO_2$) layer 111, a lower electrode layer 113 formed on the Si layer 112, a piezoelectric thin film layer 114 formed on the lower electrode layer 113, and an upper electrode layer (115A and 115B) formed on the piezoelectric thin film layer 114. The upper electrode layer is made up of a detection electrode 115A and a driving electrode 115B. The detection electrode 115A is formed to extend over not only a region spanning from substantially a center of the vibrating plate 105 in the lengthwise direction to an end portion thereof on the side including the base portion 106A, but also over a region near a portion of the frame 102 where the frame 102 is connected to the base portion 106A of the vibrating plate 105. The detection electrode 115A is connected to the led-out electrode 116A. The driving electrode 115B is formed to extend over not only a region spanning from substantially the center of the vibrating plate 105 in the lengthwise direction to an end portion thereof on the side including the base portion 106B, but also over the support member 104, the holding member 103C, and a region near a portion of the frame 102 where the frame 102 is connected to the holding member 103C. The detection electrode 115B is connected to the led-out electrode 116B. The led-out electrodes 116A and 116B are connected to a control circuit.

In the acceleration sensor according to the first related art, when a driving signal is input to the led-out electrode 116B from the control circuit, a portion of the piezoelectric thin film layer 114, the portion being located in a region where the driving electrode 115B and the lower electrode layer 113 are opposed to each other, is caused to extend and contract upon application of an electric field generated by the driving signal. The vibrating plate 105 is thus vibrated. At that time, with the vibration of the vibrating plate 105, pressure is exerted on the portion of the piezoelectric thin film layer 114, located in the region where the detection electrode 115A and the lower electrode layer 113 are opposed to each other, whereby electric charges are generated in that portion. The generated electric charges are output as a detection signal from the led-out electrode 116A.

By using the detection signal, the control circuit drives the acceleration sensor device 101 into a state where the vibrating plate 105 is driven and vibrated stably at a resonant frequency of the natural vibration thereof.

When acceleration in the X-axis direction is applied, as denoted by an arrow G, to the acceleration sensor according to the first related art in the state where the vibrating plate 105 is driven and vibrated, the support member 104 is displaced in the X-axis direction by an inertial force generated upon the application of the acceleration. Accordingly, the vibrating plate 105 in the driven and vibrated state is caused to extend (or contract) in the X-axis direction by a force acting on the vibrating plate 105 from the support member 104 with the displacement of the support member 104, and the resonant frequency of the natural vibration of the vibrating plate 105 is changed. Thus, a frequency of the detection signal is changed in accordance with the change in the resonant frequency of the natural vibration of the vibrating plate 105, and a magnitude of the acceleration can be detected from the frequency change of the detection signal.

There is also an acceleration sensor of optical detection type.

FIG. 11A is a plan view, looking at an X-Y plane, of an acceleration sensor device 201 according to second related art (see, e.g., Japanese Unexamined Patent Application Publication No. 2006-105764). FIG. 11B is a side view, looking at a Y-Z plane, of the acceleration sensor device 201.

The acceleration sensor device 201 includes fixation members 202A and 202B, coupling members 203A, 203B, 203C and 203D, a weight member 204, a light source 205, and a light detector 206. In the following description, an axis extending along the direction in which the fixation member 202A, the coupling members 203A and 203B, the weight member 204, the coupling members 203C and 203D, and the fixation member 202B are arranged in the acceleration sensor device 201 in the mentioned order is defined as an X-axis of an orthogonal coordinate system, an axis extending in the direction normal to the weight member 204 (i.e., the direction of thickness thereof) is defined as a Z-axis of the orthogonal coordinate system, and an axis being perpendicular to the X-axis and the Z-axis is defined as a Y-axis of the orthogonal coordinate system.

As illustrated in FIG. 11A, the fixation members 202A and 202B are arranged on both sides of the weight member 204 in the X-axis direction. The fixation member 202A is connected to the weight member 204 by the coupling members 203A and 203B. The fixation member 202B is connected to the weight member 204 by the coupling members 203C and 203D. The weight member 204 preferably is in the form of a quadrangular plate having two sides parallel to the X-axis and two sides parallel to the Y-axis when looked at in a plan view. The weight member 204 is supported by the fixation members 202A and 202B on both the sides through the coupling members 203A, 203B, 203C and 203D.

Each of the coupling members 203A, 203B, 203C and 203D has two bent portions 211 that are bent with respect to the X-axis direction. The bent portions 211 of each of the coupling members 203A, 203B, 203C and 203D provide resiliency allowing each coupling member to extend and contract in the X-axis direction. Accordingly, the weight member 204 supported by the fixation members 202A and 202B on both the sides through the coupling members 203A, 203B, 203C and 203D is smoothly displaceable in the X-axis direction.

As illustrated in FIG. 11B, the light source 205 is fixed above the weight member 204. The light detector 206 is fixed under the weight member 204. Light emitted from the light source 205 is partly blocked off by the weight member 204, and the remaining part of the emitted light is received by the light detector 206 without being blocked off by the weight member 204. The light detector 206 outputs a current corresponding to an amount of the received light.

Because of the weight member 204 being smoothly displaceable in the X-axis direction, even when acceleration in the X-axis direction is slightly applied to the acceleration sensor 201, the weight member 204 is displaced sufficiently, thereby causing sufficient change in the amount of light received by the light detector 206. Hence a magnitude of the output current from the light detector 206 is changed. Therefore, the presence or the absence of acceleration and the magnitude of the acceleration can be detected by measuring the magnitude of the output current from the light detector 206 with an electronic circuit (not illustrated). Furthermore, since the weight member 204 is coupled to the fixation members 202A and 202B by the four coupling members 203A, 203B, 203C and 203D in total, the weight member 204 is supported with sufficient strength, and the strength of the acceleration sensor is increased in its entirety.

In the above-described acceleration sensor device 101, the support member 104 is connected to the holding members 103A, 103B and 103C at two positions on the left side and at one position on the right side, whereas the frame 102 is connected to the holding members 103A, 103B and 103C at two positions on the left side and at two positions on the right side. In the above-described acceleration sensor 201, the weight member 204 is connected to the coupling members 203A, 203B, 203C and 203D at two positions on the left side and at two positions on the right side, whereas the fixation members 202A and 202B are connected to the coupling members 203A, 203B, 203C and 203D at two positions on the left side and at two positions on the right side.

When the weight member is supported at many positions as in the above-described cases, the inertial force generated upon the application of acceleration is distributed and a displacement magnitude of the weight member is reduced. Hence sensitivity of detecting the acceleration in the acceleration sensor is reduced. Moreover, in the case of detecting the acceleration with the light detector, the sensor size in the Z-axis direction is increased and reduction in size is difficult to realize.

SUMMARY OF THE INVENTION

In view of the above-mentioned state of the art, preferred embodiments of the present invention provide an acceleration sensor with high detection sensitivity for acceleration.

An acceleration sensor according to a preferred embodiment of the present invention includes a fixation member, a weight member, a vibrating beam, a holding beam, a driver, and a detector. The weight member includes two sides opposed to each other in a first direction when looked at in a plan view. The vibrating beam includes one end portion connected at one location to the fixation member and the other end portion connected at one location to one of the two sides of the weight member opposing to each other in the first direction when looked at in a plan view. The vibrating beam supports the weight member to be displaceable in the first direction. The holding beam includes one end portion connected at one location to the fixation member and the other end portion connected at one location to the other of the two sides of the weight member opposing to each other in the first direction when looked at in a plan view. The holding beam supports the weight member to be displaceable in the first direction. The driver is disposed on the vibrating beam and vibrates the vibrating beam. The detector is disposed on the vibrating beam and outputs a detection signal that is changed depending on deformation of the vibrating beam.

With the above-described features, when acceleration in the first direction is applied in a state where the vibrating beam is vibrated, the weight member is displaced in the first direction relative to the fixation member by an inertial force generated upon the application of the acceleration. With the displacement of the weight member, the vibrating beam is deformed. Since the weight member is supported at two locations by the vibrating beam and the holding beam, the inertial force generated upon the application of the acceleration is prevented from being distributed, and a displacement magnitude of the weight member is significantly increased. Therefore, the vibrating beam is deformed to a larger extent, and the resonance frequency of the natural vibration of the vibrating beam is changed significantly. As a result, detection sensitivity for the acceleration is significantly increased.

In the acceleration sensor described above, preferably, the vibrating beam is vibrated by the driver in a point-symmetric vibration mode.

With the above-described feature, the detection sensitivity for the acceleration is significantly increased.

In the acceleration sensor described above, preferably, the vibrating beam has a meandering shape zigzagging with respect to the first direction and a point-symmetric shape with a center point thereof being a reference. The vibrating beam includes a weight member-side connecting portion disposed to extend in the first direction from a connected position between the vibrating beam and the weight member, a fixation member-side connecting portion disposed to extend in the first direction from a connected position between the vibrating beam and the fixation member, and a vibrating portion connected between the weight member-side connecting portion and the fixation member-side connecting portion and disposed to extend in a second direction perpendicular or substantially perpendicular to the first direction. The holding beam includes a weight member-side connecting portion disposed to extend in the first direction from a connected position between the holding beam and the weight member, a fixation member-side connecting portion disposed to extend in the first direction from a connected position between the holding beam and the fixation member, and a vibrating portion connected between the weight member-side connecting portion and the fixation member-side connecting portion and disposed to extend in the second direction. The vibrating portion connected to the weight member-side connecting portion in the holding beam and the vibrating portion connected to the weight member-side connecting portion in the vibrating beam are disposed to extend in opposite directions. With the above-described features, even when a force in the second direction is exerted on the weight member, the weight member is hard to rotate or displace in the state supported by the vibrating beam and the holding beam as mentioned above.

In the acceleration sensor described above, preferably, a center position of the fixation member-side connecting portion of the vibrating beam in the second direction is coincident with a center position of the weight member in the second direction. Furthermore, in the acceleration sensor described above, preferably, a center position of the weight member-side connecting portion of the vibrating beam in the second direction is offset from a center position of the weight member in the second direction toward a direction in which a size of the vibrating portion connected to the weight member-side connecting portion in the second direction is increased. With the above-described feature, the detection sensitivity for the acceleration is significantly increased.

In the acceleration sensor described above, preferably, the vibrating beam includes a plurality of vibrating portions, and a spacing between adjacent two of the plural vibrating portions in the first direction is smaller than a width of each of the plural vibrating portions in the first direction. With the above-described feature, the detection sensitivity for the acceleration is significantly increased.

In the acceleration sensor described above, preferably, in the vibrating beam, a width of each of the fixation member-side connecting portion and the weight member-side connecting portion in the second direction is equal or substantially equal to a width of each of the plural vibrating portions in the first direction. With the above-described feature, the detection sensitivity for the acceleration is significantly increased.

According to various preferred embodiments of the present invention, since the weight member is supported at two positions by the vibrating beam and the holding beam, the inertial force generated upon the application of acceleration is prevented from being distributed, and a displacement magnitude of the weight member is increased. Therefore, the vibrating beam is deformed to a larger extent and the resonant frequency of the natural vibration of the vibrating beam is changed significantly. As a result, the detection sensitivity for the acceleration is significantly increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An acceleration sensor 1 according to a first preferred embodiment of the present invention will be described below.

Figure 1A:
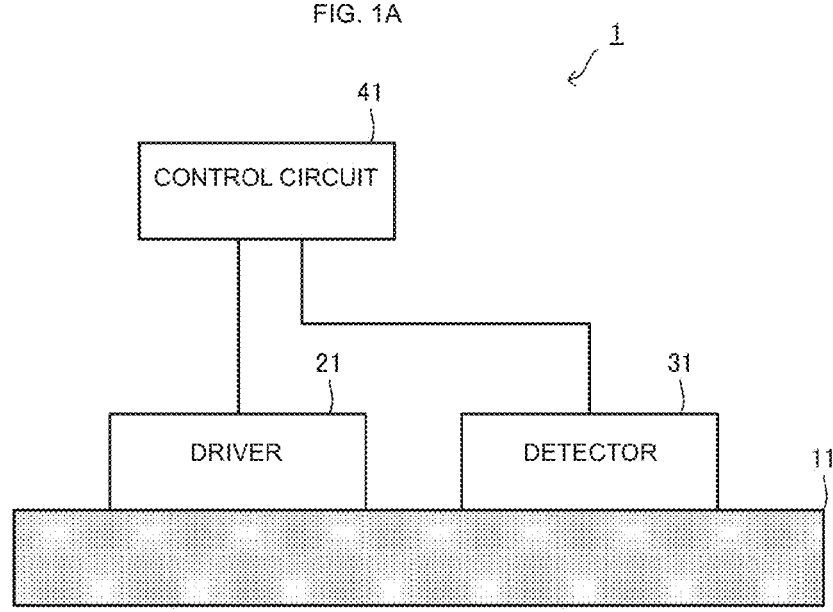
FIGS. 1A and 1B are explanatory views to explain an acceleration sensor according to a first preferred embodiment of the present invention, and an acceleration sensor device constituting the acceleration sensor.

FIG. 1A is a block diagram to explain the configuration of the acceleration sensor 1 according to the first preferred embodiment of the present invention.

The acceleration sensor 1 includes an acceleration sensor device 11 and a control circuit 41. The acceleration sensor device 11 includes a driver 21 and a detector 31. The control circuit 41 is connected to the driver 21 and the detector 31.

Figure 1B:
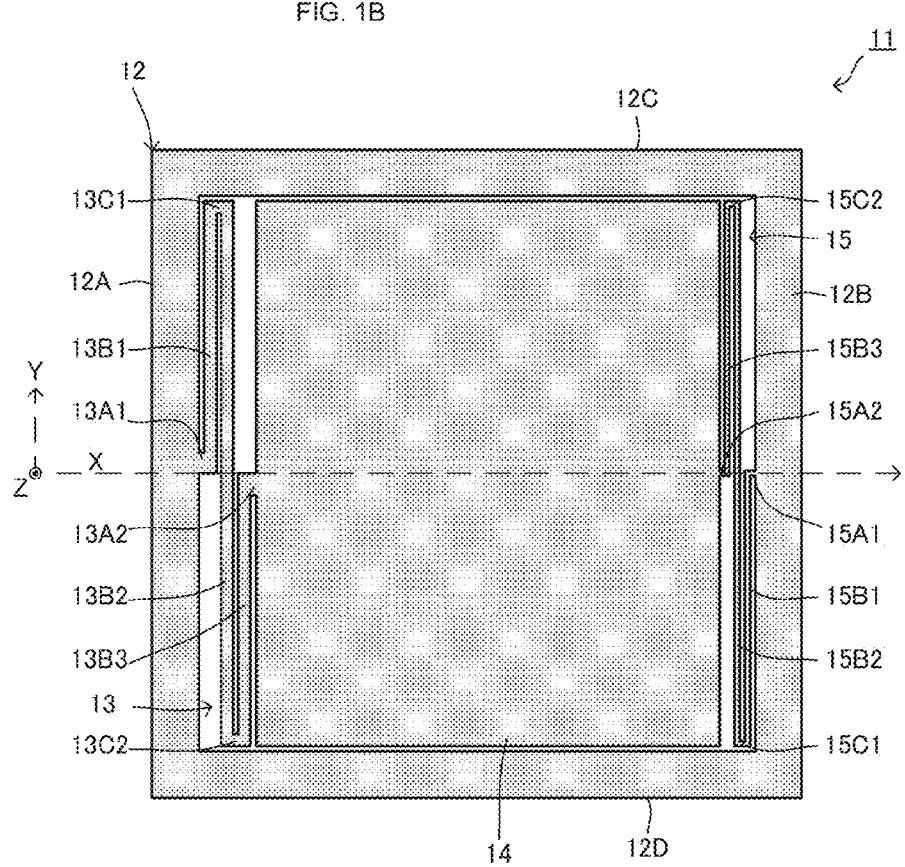

FIG. 1B is a plan view, looking at an X-Y plane, of the acceleration sensor device 11. As illustrated in FIG. 1B, the acceleration sensor device 11 includes a fixation member 12, a vibrating beam 13, a weight member 14, a holding beam 15, and a support substrate (not illustrated). In the following description, an axis extending along the direction in which the vibrating beam 13, and the weight member 14, the holding beam 15 are arranged in the mentioned order is defined as an X-axis of an orthogonal coordinate system, an axis extending in the direction normal to the acceleration sensor device (i.e., the direction of thickness thereof) is defined as a Z-axis of the orthogonal coordinate system, and an axis being perpendicular to the X-axis and the Z-axis is defined as a Y-axis of the orthogonal coordinate system. Additionally, the X-axis direction is also called a first direction.

The fixation member 12, the vibrating beam 13, the weight member 14, and the holding beam 15 preferably are each made of silicon and are formed by etching a silicon substrate, for example.

The fixation member 12 preferably is a frame-shaped member with a rectangular or substantially rectangular external shape. The vibrating beam 13, the weight member 14, and the holding beam 15 are arranged inside the fixation member 12. The fixation member 12 is joined at its lower surface to the support substrate, and it supports the vibrating beam 13, the weight member 14, and the holding beam 15 in a state floating from the support substrate.

The fixation member 12 has a point-symmetric shape in the X-Y plane with its center point being a reference, and includes fixation-member constituting portions 12A, 12B, 12C and 12D. The fixation-member constituting portions 12A and 12B are disposed to extend in the Y-axis direction. Each of the fixation-member constituting portions 12A and 12B is connected at its end portion on the positive direction side of the Y-axis to the fixation-member constituting portion 12C, and is connected at its end portion on the negative direction side of the Y-axis to the fixation-member constituting portion 12D. The fixation-member constituting portion 12A is arranged on the negative direction side of the X-axis. The fixation-member constituting portion 12B is arranged on the positive direction side of the X-axis. The fixation-member constituting portions 12C and 12D are disposed to extend in the X-axis direction. Each of the fixation-member constituting portions 12C and 12D is connected at its end portion on the positive direction side of the X-axis to the fixation-member constituting portion 12B, and is connected at its end portion on the negative direction side of the X-axis to the fixation-member constituting portion 12A. The fixation-member constituting portion 12C is arranged on the positive direction side of the Y-axis. The fixation-member constituting portion 12D is arranged on the negative direction side of the Y-axis.

The vibrating beam 13 preferably is configured in a meandering shape zigzagging with respect to the X-axis direction in the X-Y plane. In more detail, the vibrating beam 13 has a point-symmetric shape in the X-Y plane with its center point being a reference, and it is made up of a fixation member-side connecting portion 13A1, a weight member-side connecting portion 13A2, and vibrating portions 13B1, 13B2, 13B3, 13C1 and 13C2.

The fixation member-side connecting portion 13A1 is disposed to extend in the X-axis direction. An end portion of the fixation member-side connecting portion 13A1 on the negative direction side of the X-axis is connected to the fixation-member constituting portion 12A at a position near or adjacent to a center of the fixation-member constituting portion 12A in the lengthwise direction thereof (i.e., in the Y-axis direction). An end portion of the fixation member-side connecting portion 13A1 on the positive direction side of the X-axis is connected to the vibrating portion 13B1. The vibrating portion 13B1 is disposed to extend in the Y-axis direction. An end portion of the vibrating portion 13B1 on the negative direction side of the Y-axis is connected to the fixation member-side connecting portion 13A1. An end portion of the vibrating portion 13B1 on the positive direction side of the Y-axis is connected to the vibrating portion 13C1. The vibrating portion 13C1 is disposed to extend in the X-axis direction. An end portion of the vibrating portion 13C1 on the negative direction side of the X-axis is connected to the vibrating portion 13B1. An end portion of the vibrating portion 13C1 on the positive direction side of the X-axis is connected to the vibrating portion 13B2. The vibrating portion 13B2 is disposed to extend in the Y-axis direction. An end portion of the vibrating portion 13B2 on the negative direction side of the Y-axis is connected to the vibrating portion 13C2. An end portion of the vibrating portion 13B2 on the positive direction side of the Y-axis is connected to the vibrating portion 13C1. The vibrating portion 13C2 is disposed to extend in the X-axis direction. An end portion of the vibrating portion 13C2 on the negative direction side of the X-axis is connected to the vibrating portion 13B2. An end portion of the vibrating portion 13C2 on the positive direction side of the X-axis is connected to the vibrating portion 13B3. The vibrating portion 13B3 is disposed to extend in the Y-axis direction. An end portion of the vibrating portion 13B3 on the negative direction side of the Y-axis is connected to the vibrating portion 13C2. An end portion of the vibrating portion 13B3 on the positive direction side of the Y-axis is connected to the weight member-side connecting portion 13A2. The weight member-side connecting portion 13A2 is disposed to extend in the X-axis direction. An end portion of the weight member-side connecting portion 13A2 on the negative direction side of the X-axis is connected to the vibrating portion 13B3. An end portion of the weight member-side connecting portion 13A2 on the positive direction side of the X-axis is connected to the weight member 14.

The weight member 14 preferably is a quadrangular or substantially quadrangular plate including two opposing sides parallel or substantially parallel to the X-axis and two opposing sides parallel to the Y-axis when looked at in a plan view. The weight member 14 has a point-symmetric shape in the X-Y plane with its center point being a reference. The weight member 14 is connected to the vibrating beam 13 at a position near or at a center of one of the two opposing sides thereof parallel or substantially parallel to the Y-axis, and to the holding beam 15 at a position near or adjacent to a center of the other of the two opposing sides.

The holding beam 15 preferably is configured in a meandering shape zigzagging with respect to the X-axis direction in the X-Y plane. In more detail, the holding beam 15 has a point-symmetric shape in the X-Y plane with its center point being a reference, and includes a fixation member-side connecting portion 15A1, a weight member-side connecting portion 15A2, and vibrating portions 15B1, 15B2, 15B3, 15C1 and 15C2.

The fixation member-side connecting portion 15A1 is disposed to extend in the X-axis direction. An end portion of the fixation member-side connecting portion 15A1 on the positive direction side of the X-axis is connected to the fixation-member constituting portion 12B at a position near or adjacent to a center of the fixation-member constituting portion 12B in the lengthwise direction thereof (i.e., in the Y-axis direction). An end portion of the fixation member-side connecting portion 15A1 on the negative direction side of the X-axis is connected to the vibrating portion 15B1. The vibrating portion 15B1 is disposed to extend in the Y-axis direction. An end portion of the vibrating portion 15B1 on the positive direction side of the Y-axis is connected to the fixation member-side connecting portion 15A1. An end portion of the vibrating portion 15B1 on the negative direction side of the Y-axis is connected to the vibrating portion 15C1. The vibrating portion 15C1 is disposed to extend in the X-axis direction. An end portion of the vibrating portion 15C1 on the positive direction side of the X-axis is connected to the vibrating portion 15B1. An end portion of the vibrating portion 15C1 on the negative direction side of the X-axis is connected to the vibrating portion 15B2. The vibrating portion 15B2 is disposed to extend in the Y-axis direction. An end portion of the vibrating portion 15B2 on the positive direction side of the Y-axis is connected to the vibrating portion 15C2. An end portion of the vibrating portion 15B2 on the negative direction side of the Y-axis is connected to the vibrating portion 15C1. The vibrating portion 15C2 is disposed to extend in the X-axis direction. An end portion of the vibrating portion 15C2 on the positive direction side of the X-axis is connected to the vibrating portion 15B2. An end portion of the vibrating portion 15C2 on the negative direction side of the X-axis is connected to the vibrating portion 15B3. The vibrating portion 15B3 is disposed to extend in the Y-axis direction. An end portion of the vibrating portion 15B3 on the positive direction side of the Y-axis is connected to the vibrating portion 15C2. An end portion of the vibrating portion 15B3 on the negative direction side of the Y-axis is connected to the weight member-side connecting portion 15A2. The weight member-side connecting portion 15A2 is disposed to extend in the X-axis direction. An end portion of the weight member-side connecting portion 15A2 on the positive direction side of the X-axis is connected to the vibrating portion 15B3. An end portion of the weight member-side connecting portion 15A2 on the negative direction side of the X-axis is connected to the weight member 14.

In the acceleration sensor device 11, respective centers of the fixation member 12, the vibrating beam 13, the weight member 14, and the holding beam 15 in the X-Y plane are arranged to lie on the X-axis.

Each of the vibrating beam 13 and the holding beam 15 has resiliency allowing the beam to expand and contract in the X-axis direction. Thus, the weight member 14 supported by the vibrating beam 13 and the holding beam 15 is displaceable in the X-axis direction. Accordingly, when acceleration in the X-axis direction is applied to the acceleration sensor device 11, the weight member 14 is displaced in the X-axis direction.

The vibrating portion 13B3 of the vibrating beam 13 and the vibrating portion 15B3 of the holding beam 15 are disposed to extend from respective weight member-side connecting portions along the Y-axis direction in opposite directions. Therefore, even when a force in the Y-axis direction is applied to the weight member 14, the weight member 14 is hard to rotate or displace due to the above-described configurations of the vibrating beam 13 and the holding beam 15.

Figure 2A:
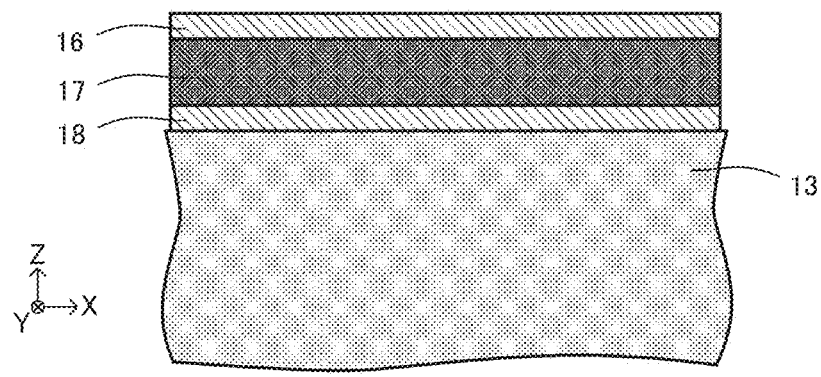
FIGS. 2A and 2B are schematic views to explain the structure of a vibrating beam in the acceleration sensor device that constitutes the acceleration sensor according to the first preferred embodiment of the present invention.
Figure 2B:
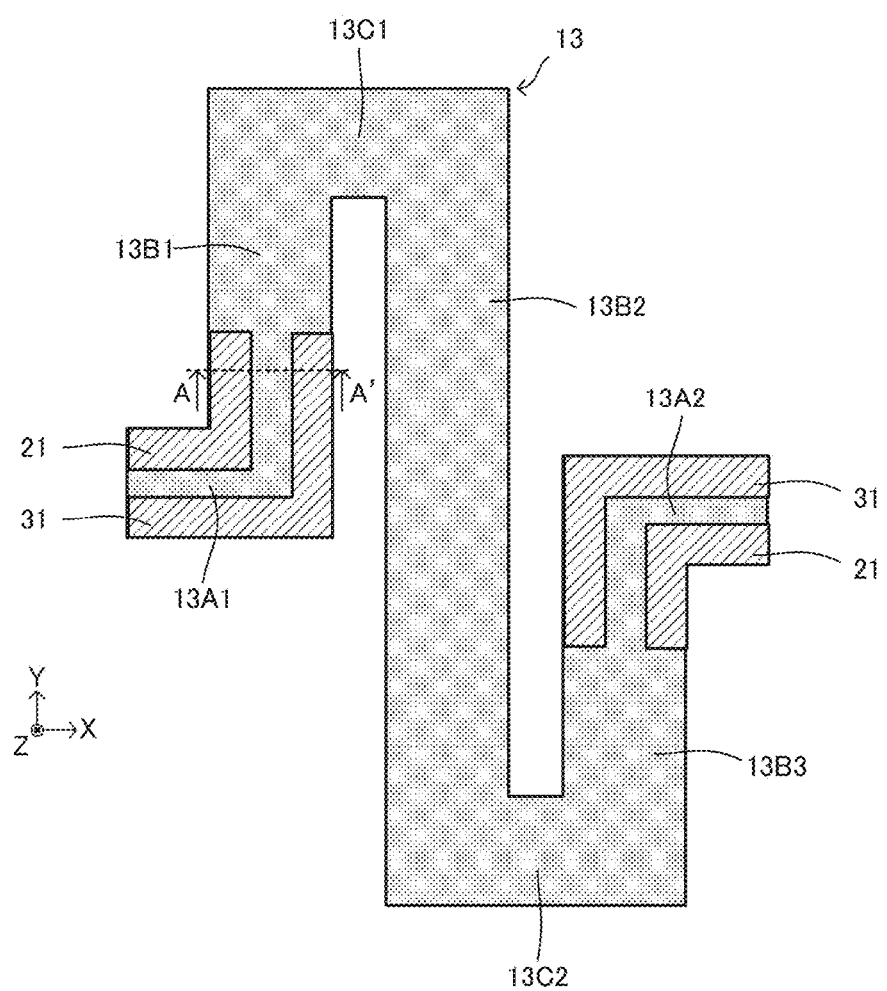

FIG. 2A is a sectional view, taken along the X-Z plane, of a particular portion of the vibrating beam 13 in the acceleration sensor device 11. FIG. 2B is a plan view, looking at the X-Y plane, of the vibrating beam 13 in the acceleration sensor device 11. FIG. 2A depicts a section taken along a dotted line A-A' in FIG. 2B.

As illustrated in FIG. 2B, the vibrating beam 13 includes drivers 21 and detectors 31. Each of the drivers 21 and the detectors 31 has a structure illustrated in FIG. 2A. As illustrated in FIG. 2A, the drivers 21 and the detectors 31 are each constituted by a lower electrode layer 18 provided on the vibrating beam 13 at the upper surface side (i.e., the positive direction side of the Z-axis), a piezoelectric layer 17 provided on the lower electrode layer 18, and an upper electrode layer 16 provided on the piezoelectric layer 17. The piezoelectric layer 17 preferably is a thin film made of a piezoelectric material, such as aluminum nitride, PZT, sodium potassium niobate, or zinc oxide. The lower electrode layer 18 defines and serves as an electrode connected to the ground, and it is joined to the vibrating beam 13. The upper electrode layer 16 defines and serves as an electrode that is led out to the fixation member 12, illustrated in FIG. 1B, through a lead wiring (not illustrated), and that is electrically connected to the control circuit 41 illustrated in FIG. 1A.

In the acceleration sensor 1, when a driving signal is input to the upper electrode layer 16 of the driver 21 from the control circuit 41, the vibrating beam 13 is driven and vibrated. More specifically, when the driving signal is input to the upper electrode layer 16 of the driver 21, an electric field is applied to the piezoelectric layer 17, thus causing the piezoelectric layer 17 to extend and contract. The vibrating beam 13 is vibrated upon extension and contraction of the piezoelectric layer 17 of the driver 21. At that time, with the vibration of the vibrating beam 13, pressure is exerted on the piezoelectric layer 17 of the detector 31, such that electric charges are generated in the piezoelectric layer 17. The generated electric charges are output as a detection signal to the control circuit 41 from the upper electrode layer 16 of the detector 31. By using the detection signal, the control circuit 41 drives the acceleration sensor device 11 into a state where the vibrating beam 13 is driven and vibrated stably at a resonant frequency of the natural vibration thereof.

When acceleration in the X-axis direction is applied to the acceleration sensor device 11 in the state where the vibrating beam 13 is driven and vibrated, the weight member 14 is displaced in the X-axis direction by an inertial force generated upon the application of the acceleration. Accordingly, the vibrating beam 13 in the driven and vibrated state is caused to extend (or contract) in the X-axis direction by a force acting on the vibrating beam 13 from the weight member 14 with the displacement of the weight member 14, and the resonant frequency of the natural vibration of the vibrating beam 13 is changed. Thus, a frequency of the detection signal is changed in accordance with the change in the resonant frequency of the natural vibration of the vibrating beam 13, and a magnitude of the acceleration is detected from the frequency change of the detection signal.

The drivers 21 and the detectors 31 have point-symmetric shapes in the X-Y plane with a center point of the vibrating beam 13 being a reference. In more detail, two pairs of drivers 21 and detectors 31 are disposed in and near or adjacent to the fixation member-side connecting portion 13A1 and the weight member-side connecting portion 13A2 of the vibrating beam 13. On each of the sides near or adjacent to the fixation member-side connecting portion 13A1 and the weight member-side connecting portion 13A2, the driver 21 and the detector 31 in pair are arranged parallel or substantially parallel to each other.

In and near or adjacent to the fixation member-side connecting portion 13A1, the driver 21 preferably has an L-shaped or substantially L-shaped configuration, when looked at in a plan view, and extends from a region of the fixation member-side connecting portion 13A1 on the positive direction side of the Y-axis to a region of the vibrating portion 13B1 on the negative direction side of the X-axis and on the negative direction side of the Y-axis. The detector 31 also preferably has an L-shaped or substantially L-shaped configuration, when looked at in a plan view, to extend from a region of the fixation member-side connecting portion 13A1 on the negative direction side of the Y-axis to a region of the vibrating portion 13B1 on the positive direction side of the X-axis and on the negative direction side of the Y-axis.

Similarly, in and near or adjacent to the weight member-side connecting portion 13A2, the driver 21 preferably has an L-shaped or substantially L-shaped configuration, when looked at in a plan view, to extend from a region of the weight member-side connecting portion 13A2 on the negative direction side of the Y-axis to a region of the vibrating portion 13B3 on the positive direction side of the X-axis and on the positive direction side of the Y-axis. The detector 31 also preferably has an L-shaped or substantially L-shaped configuration, when looked at in a plan view, to extend from a region of the weight member-side connecting portion 13A2 on the positive direction side of the Y-axis to a region of the vibrating portion 13B3 on the negative direction side of the X-axis and on the positive direction side of the Y-axis.

As described above, the vibrating beam 13 has the point-symmetric shape in the X-Y plane with its center point being a reference. Furthermore, the drivers 21 and the detectors also have the point-symmetric shapes in the X-Y plane with the center point of the vibrating beam 13 being a reference. Thus, since the shapes of the vibrating beam 13 and the electrode layout are point-symmetric, the vibrating beam 13 is vibrated in a point-symmetric vibration mode when the drivers 21 are driven.

Figure 3A:
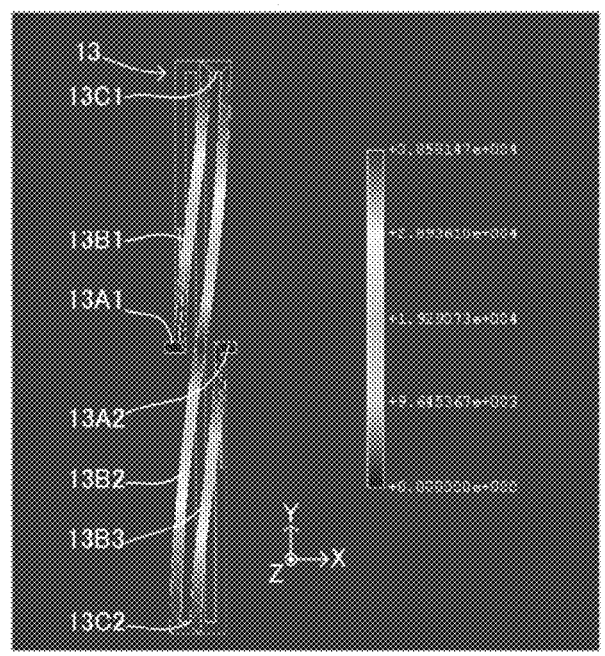
FIGS. 3A and 3B are contour figures representing deformation caused upon driving of the acceleration sensor device that constitutes the acceleration sensor according to the first preferred embodiment of the present invention.
Figure 3B:
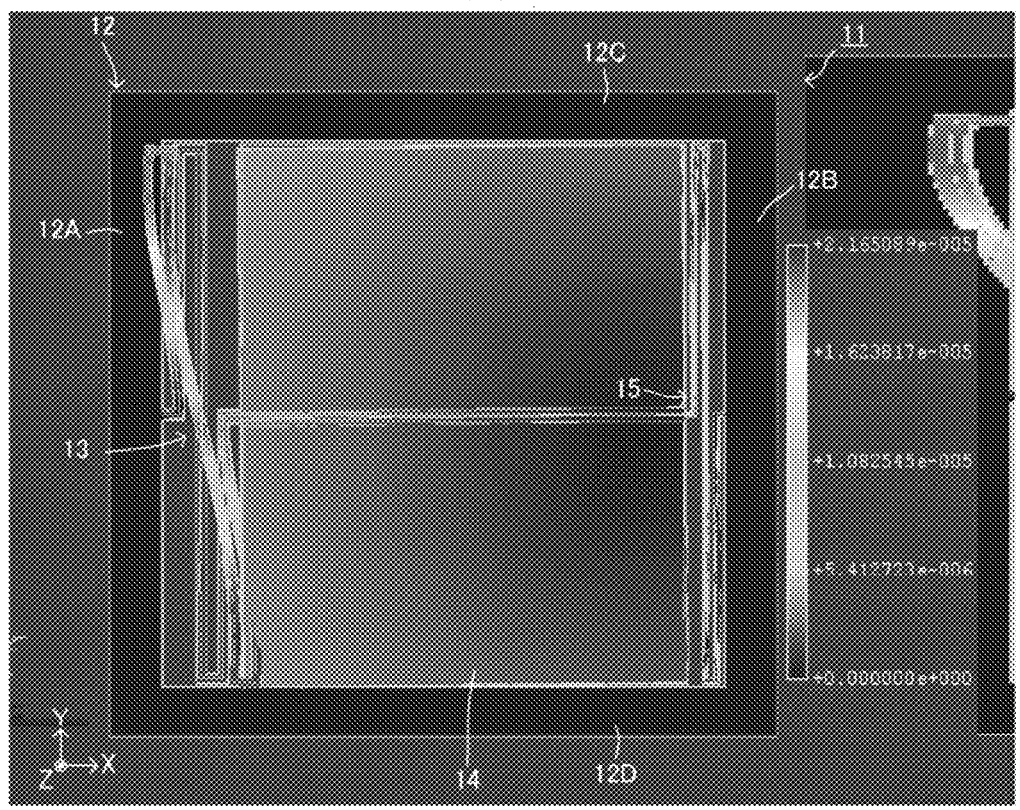

FIG. 3A is a contour figure representing displacement magnitudes at various points in the vibrating beam 13 in the state where the vibrating beam 13 is vibrated in the point-symmetric vibration mode, and FIG. 3B is a contour figure representing displacement magnitudes at various points in the acceleration sensor device 11 in the state where the vibrating beam 13 is vibrated in the point-symmetric vibration mode.

When driving signals in phase are input to the two drivers 21 disposed on the vibrating beam 13 from the control circuit 41 illustrated in FIG. 1A, the piezoelectric layer 17 is caused to extend and contract in each of the two drivers 21. As a result, each of the two drivers 21 alternately repeats the state of extending in the lengthwise direction and the state of contracting in the lengthwise direction.

Thus, in the state where the driver 21 extends in the lengthwise direction, as illustrated in FIG. 3A, an angle defined by the fixation member-side connecting portion 13A1 and the vibrating portion 13B1 of the vibrating beam 13 at a connected position therebetween, and an angle defined by the weight member-side connecting portion 13A2 and the vibrating portion 13B3 at a connected position therebetween are increased. In the state where the phase of each driving signal is shifted through 180° and the driver 21 contracts in the lengthwise direction, as illustrated in FIG. 3B, the angle defined by the fixation member-side connecting portion 13A1 and the vibrating portion 13B1 of the vibrating beam 13 at the connected position therebetween, and the angle defined by the weight member-side connecting portion 13A2 and the vibrating portion 13B3 at the connected position therebetween are reduced.

Because of the vibrating portions 13B2, 13C1 and 13C2 being connected between the vibrating portion 13B1 and the vibrating portion 13B3, when the angle defined by the fixation member-side connecting portion 13A1 and the vibrating portion 13B1 at the connected position therebetween and the angle defined by the weight member-side connecting portion 13A2 and the vibrating portion 13B3 at the connected position therebetween are changed, the vibrating portions 13B1 and 13B3 are vibrated in a manner flexing in the X-axis direction. Correspondingly, the vibrating portion 13B2 is also vibrated in a manner flexing in the X-axis direction.

More specifically, in the state illustrated in FIG. 3A, the vibrating portion 13B1 and a region of the vibrating portion 13B2, which is located on the more positive side in the Y-axis direction than a center of the vibrating portion 13B2 in the lengthwise direction (i.e., in the Y-axis direction), are flexed toward the positive direction side of the X-axis. Furthermore, a region of the vibrating portion 13B2, which is located on the more negative side in the Y-axis direction than the center of the vibrating portion 13B2 in the lengthwise direction (i.e., in the Y-axis direction), and the vibrating portion 13B3 are flexed toward the negative direction side of the X-axis.

In the state illustrated in FIG. 3B, the vibrating portion 13B1 and the region of the vibrating portion 13B2, which is located on the more positive side in the Y-axis direction than the center of the vibrating portion 13B2 in the lengthwise direction (i.e., in the Y-axis direction), are flexed toward the negative direction side of the X-axis. Furthermore, the region of the vibrating portion 13B2, which is located on the more negative side in the Y-axis direction than the center of the vibrating portion 13B2 in the lengthwise direction (i.e., in the Y-axis direction), and the vibrating portion 13B3 are flexed toward the positive direction side of the X-axis.

In spite of the above-described point-symmetric vibration mode being generated in the vibrating beam 13, the fixation member 12, the holding beam 15, and the weight member 14 are hardly displaced as illustrated in FIG. 3B. Accordingly, the fixation member-side connecting portion 13A1, the weight member-side connecting portion 13A2, and the vicinity of the center of the vibrating portion 13B2 in the lengthwise direction (i.e., in the Y-axis direction) define and serve as nodes of the vibration, and the vibrating portions 13C1 and 13C2 are displaced to a large extent in the X-axis direction.

When acceleration in the X-axis direction is applied to the acceleration sensor device 11 in the state where the vibrating beam 13 is driven and vibrated in the point-symmetric vibration mode as described above, the weight member 14 is displaced in the X-axis direction relative to the fixation member 12 by an inertial force generated upon the application of the acceleration. With the displacement of the weight member 14, the spacing between the fixation member-side connecting portion 13A1 and the weight member-side connecting portion 13A2 of the vibrating beam 13 in the X-axis direction is changed. For example, when acceleration in the positive direction of the X-axis is applied to the acceleration sensor device 11, the inertial force acts in the negative direction of the X-axis such that the weight member 14 and the weight member-side connecting portion 13A2 are displaced in the negative direction of the X-axis, and that the spacing between the fixation member-side connecting portion 13A1 and the weight member-side connecting portion 13A2 of the vibrating beam 13 in the X-axis direction is narrowed. When acceleration in the negative direction of the X-axis is applied to the acceleration sensor device 11, the inertial force acts in the positive direction of the X-axis such that the weight member 14 and the weight member-side connecting portion 13A2 are displaced in the positive direction of the X-axis, and that the spacing between the fixation member-side connecting portion 13A1 and the weight member-side connecting portion 13A2 of the vibrating beam 13 in the X-axis direction is widened.

With the change of the spacing between the fixation member-side connecting portion 13A1 and the weight member-side connecting portion 13A2 of the vibrating beam 13 in the X-axis direction, the resonant frequency of the natural vibration of the vibrating beam 13 in the point-symmetric vibration mode is also changed.

Moreover, the detectors 31 are disposed in a region where the fixation member-side connecting portion 13A1 and the vibrating portion 13B1 are connected to each other, and in a region where the weight member-side connecting portion 13A2 and the vibrating portion 13B3 are connected to each other. In those regions, when acceleration in the X-axis direction is applied to the acceleration sensor device 11, significantly large strains are generated in phase. Accordingly, the output signals of the two detectors 31 have frequencies that are in phase and are in synchronism with the resonant frequency of the natural vibration of the vibrating beam 13 in the point-symmetric vibration mode.

The control circuit 41, illustrated in FIG. 1A, receives the output signals of the detectors 31 and sets the frequency of each driving signal in accordance with the output signals. Therefore, the vibrating beam 13 and the drivers 21, which are driven by the driving signals output from the control circuit 41, are always vibrated at the resonant frequency of the natural vibration of the vibrating beam 13 in the point-symmetric vibration mode. Furthermore, the control circuit 41 detects the frequency change of the output signal from each of the output signals of the detectors 31. A frequency of the output signal is coincident with the resonant frequency of the natural vibration of the vibrating beam 13 in the point-symmetric vibration mode, and it is changed when the resonant frequency of the natural vibration is changed with the application of acceleration in the X-axis direction to the acceleration sensor device 11. Accordingly, the control circuit 41 detects the presence or the absence of acceleration applied in the X-axis direction to the acceleration sensor device 11 and the magnitude of the applied acceleration by detecting the output signal of each detector 31 of which frequency is changed depending on the magnitude of the acceleration applied in the X-axis direction to the acceleration sensor device 11.

EXAMPLE 1

The acceleration sensor 1 according to the first preferred embodiment of the present invention will be described below in connection with non-limiting EXAMPLE 1. In the acceleration sensor of EXAMPLE 1, the X-axial size and the Y-axial size of the acceleration sensor device 11 were each set to 2.4 mm, and the resonant frequency of the natural vibration of the vibrating beam 13 in the point-symmetric vibration mode was set to about 66.4 kHz. Sensitivity was measured with an analysis using the finite element method.

In the acceleration sensor of EXAMPLE 1, sensitivity for acceleration in the X-axis direction (hereinafter referred to as X-axis sensitivity) was about 292 ppm/G (frequency modulation factor per unit gravitational acceleration). Sensitivity for acceleration in the Y-axis direction (hereinafter referred to as Y-axis sensitivity) was about 12.2 ppm/G. Sensitivity for acceleration in the Z-axis direction (hereinafter referred to as Z-axis sensitivity) was about 0.304 ppm/G. Thus, the acceleration sensor of EXAMPLE 1 had the X-axis sensitivity of about 95.9%, which corresponds to the direction of the intended detection, while it had the Y-axis sensitivity of about 4% and the Z-axis sensitivity of about 0.1%. In other words, influences caused by accelerations in the Y-axis and Z-axis directions upon the output signal were very small, and the X-axis sensitivity was extremely high.

Figure 10A:
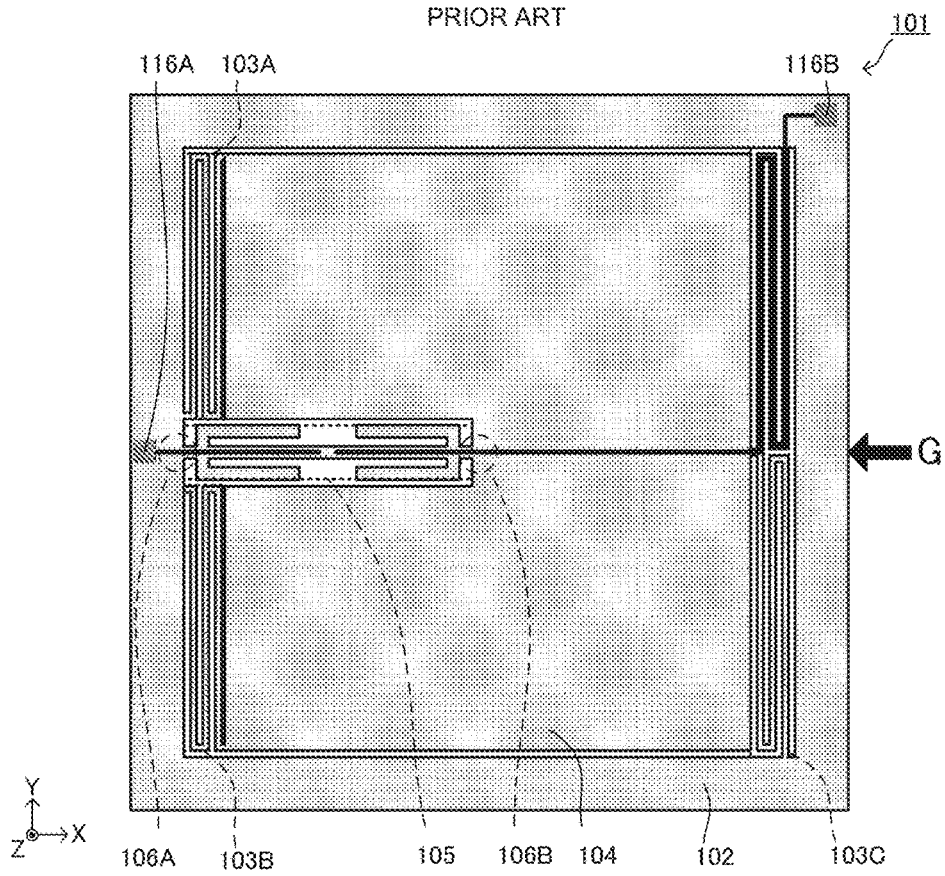
FIGS. 10A and 10B are explanatory views to explain an acceleration sensor according to first related art.
Figure 10B:
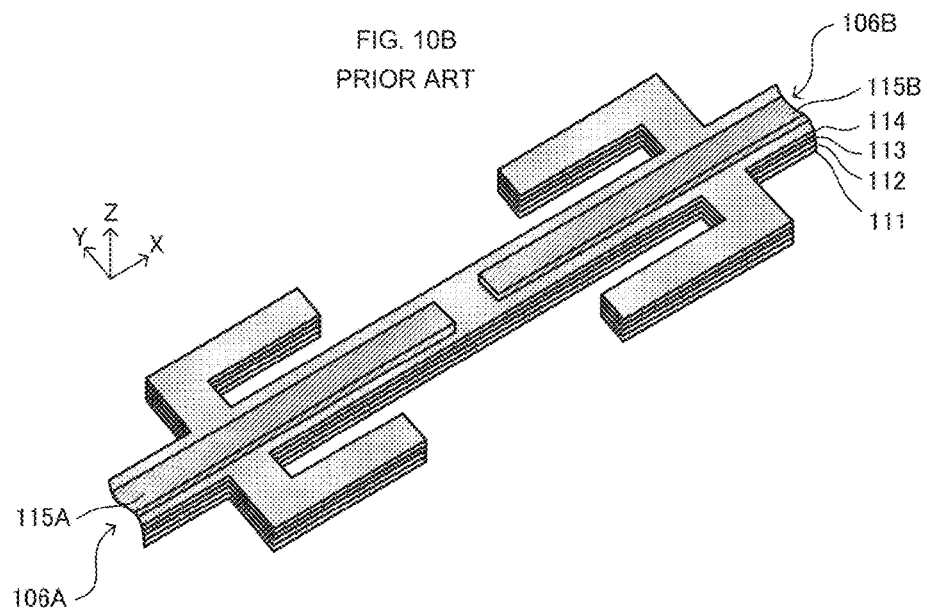
Figure 11A:
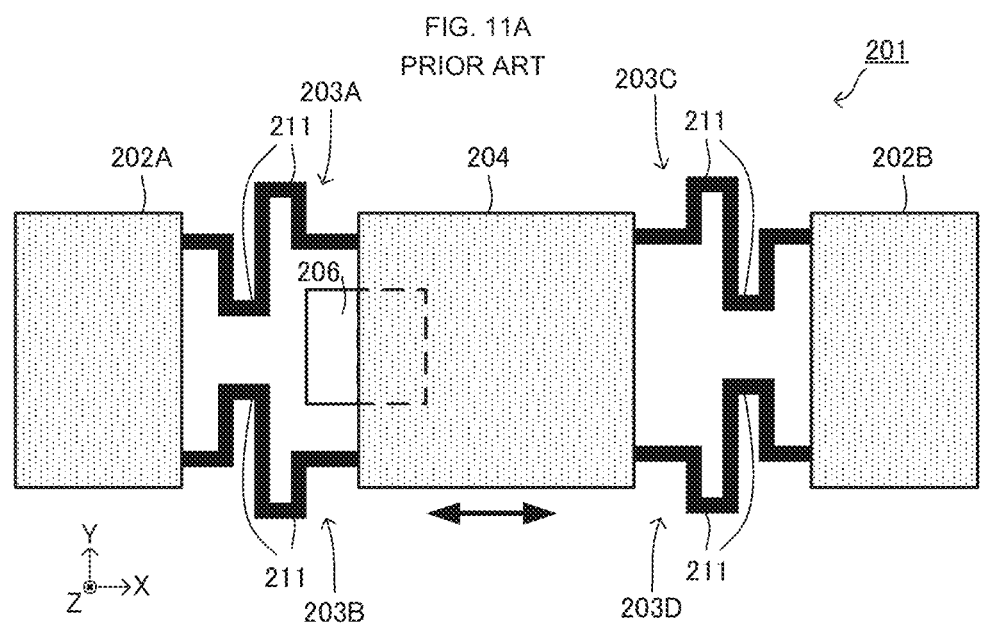
FIGS. 11A and 11B are explanatory views to explain an acceleration sensor according to second related art.
Figure 11B:
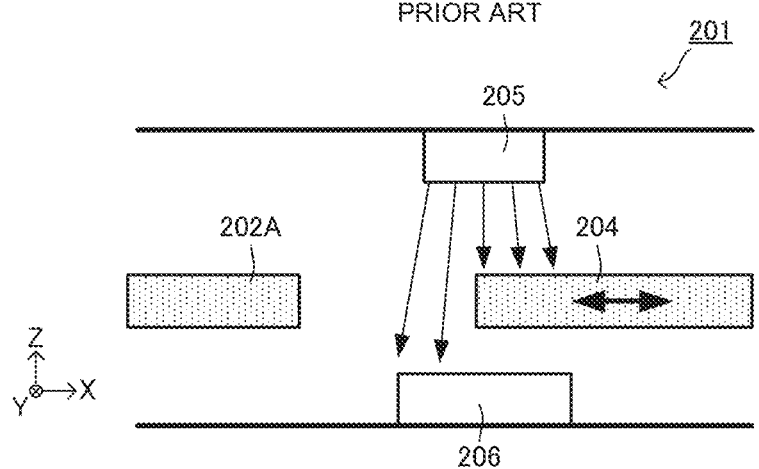

An acceleration sensor of COMPARATIVE EXAMPLE 1 was prepared and its X-axis sensitivity was measured. An acceleration sensor device of COMPARATIVE EXAMPLE 1 was the same as the acceleration sensor device 101 according to the first related art illustrated in FIGS. 10A and 10B.

The X-axis sensitivity of the acceleration sensor of COMPARATIVE EXAMPLE 1 was about 1.46 ppm/G and was much lower than that of the acceleration sensor of EXAMPLE 1. One of the reasons presumably resides in that the acceleration sensor of EXAMPLE 1 has the structure in which the weight member 14 is supported by the vibrating beam 13 and the holding beam 15 at two locations in total, whereas the acceleration sensor of COMPARATIVE EXAMPLE 1 has the structure in which the weight member is supported by the vibrating plate and the holding beams at four locations in total.

Next, an acceleration sensor of COMPARATIVE EXAMPLE 2 was prepared, and its X-axis sensitivity was measured. The acceleration sensor of COMPARATIVE EXAMPLE 2 includes an acceleration sensor device 11A in which the driver and the detector are disposed at positions different from those in the acceleration sensor device 11 of the acceleration sensor according to the first preferred embodiment such that the vibrating beam 13 is vibrated in the Y-Z plane. In the acceleration sensor of COMPARATIVE EXAMPLE 2, the X-axial size and the Y-axial size of the acceleration sensor device 11A were each set to 2.4 mm, and the resonant frequency of the natural vibration in the vibration mode was set to about 32.7 kHz.

Figure 4:
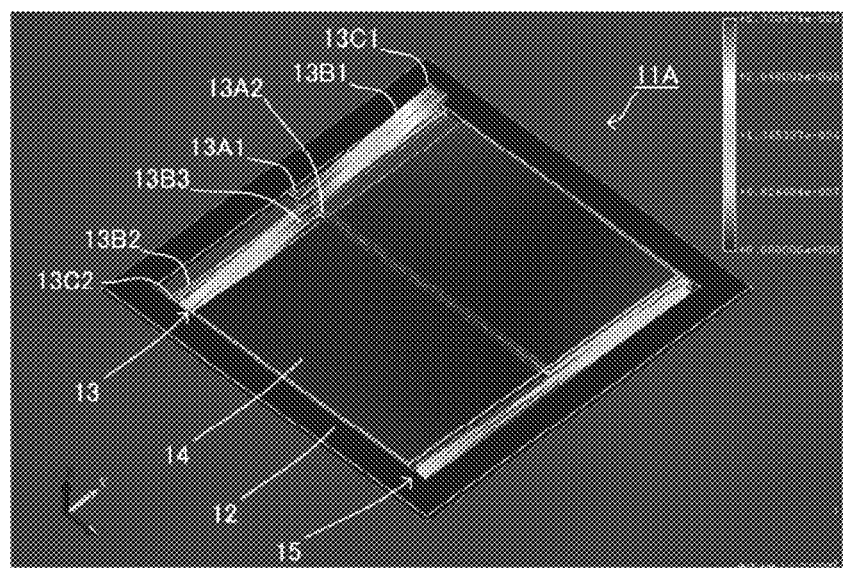
FIG. 4 is a contour figure representing deformation caused upon driving of an acceleration sensor device that constitutes an acceleration sensor according to COMPARATIVE EXAMPLE 2.

FIG. 4 is a contour figure representing displacement magnitudes at various points in the acceleration sensor device 11A, which constitutes the acceleration sensor of COMPARATIVE EXAMPLE 2, in the state where the vibrating beam 13 is driven and vibrated. In the vibration mode of the acceleration sensor device 11A, the vibrating beam 13 is vibrated in the Y-Z plane such that mainly the vibrating portions 13B1, 13B2 and 13B3 of the vibrating beam 13 are vibrated to flex in the Z-axis direction. In the state illustrated in FIG. 4, the vibrating portion 13B1 and the region of the vibrating portion 13B2, which is located on the more positive side in the Y-axis direction than the center of the vibrating portion 13B2 in the lengthwise direction (i.e., in the Y-axis direction), are flexed toward the positive direction side of the Z-axis. Furthermore, the region of the vibrating portion 13B2, which is located on the more negative side in the Y-axis direction than the center of the vibrating portion 13B2 in the lengthwise direction (i.e., in the Y-axis direction), and the vibrating portion 13B3 are flexed toward the negative direction side of the Z-axis. In the state where the phase of the vibration is shifted through 180° from that in the above case, though not illustrated in FIG. 4, the vibrating portion 13B1 and the region of the vibrating portion 13B2, which is located on the more positive side in the Y-axis direction than the center of the vibrating portion 13B2 in the lengthwise direction (i.e., in the Y-axis direction), are flexed toward the negative direction side of the Z-axis. Furthermore, the region of the vibrating portion 13B2, which is located on the more negative side in the Y-axis direction than the center of the vibrating portion 13B2 in the lengthwise direction (i.e., in the Y-axis direction), and the vibrating portion 13B3 are flexed toward the positive direction side of the Z-axis. Moreover, the fixation member 12, the holding beam 15, and the weight member 14 are hardly displaced. Accordingly, the fixation member-side connecting portion 13A1, the weight member-side connecting portion 13A2, and the vicinity of the center of the vibrating portion 13B2 in the lengthwise direction (i.e., in the Y-axis direction) define and serve as nodes of the vibration, and the vibrating portions 13C1 and 13C2 are displaced to a large extent in the Z-axis direction.

The X-axis sensitivity of the acceleration sensor of COMPARATIVE EXAMPLE 2 was about 2.9 ppm/G. On the other hand, the X-axis sensitivity of the acceleration sensor of EXAMPLE 1 was about 292 ppm/G as described above, and it was much higher than that of the acceleration sensor of COMPARATIVE EXAMPLE 2. One of the reasons presumably resides in that the acceleration sensor of EXAMPLE 1 has the structure in which acceleration is detected by utilizing vibration in the point-symmetric vibration mode where the vibration occurs in the X-Y plane, whereas the acceleration sensor of COMPARATIVE EXAMPLE 2 has the structure in which acceleration is detected by utilizing vibration in a point-asymmetric vibration mode where the vibration occurs in the Y-Z plane.

EXAMPLE 2

The acceleration sensor 1 according to the first preferred embodiment of the present invention will be described below in connection with non-limiting EXAMPLE 2. The acceleration sensor of EXAMPLE 2 includes an acceleration sensor device 11B in which the driver and the detector are disposed at positions different from those in the acceleration sensor device 11 of the acceleration sensor according to the first preferred embodiment such that the vibrating beam 13 is vibrated in the X-Y plane in a point-asymmetric vibration mode. In the acceleration sensor of EXAMPLE 2, the X-axial size and the Y-axial size of the acceleration sensor device 11B were each set to 2.4 mm, and the resonant frequency of the natural vibration in the vibration mode was set to about 14.5 kHz.

Figure 5:
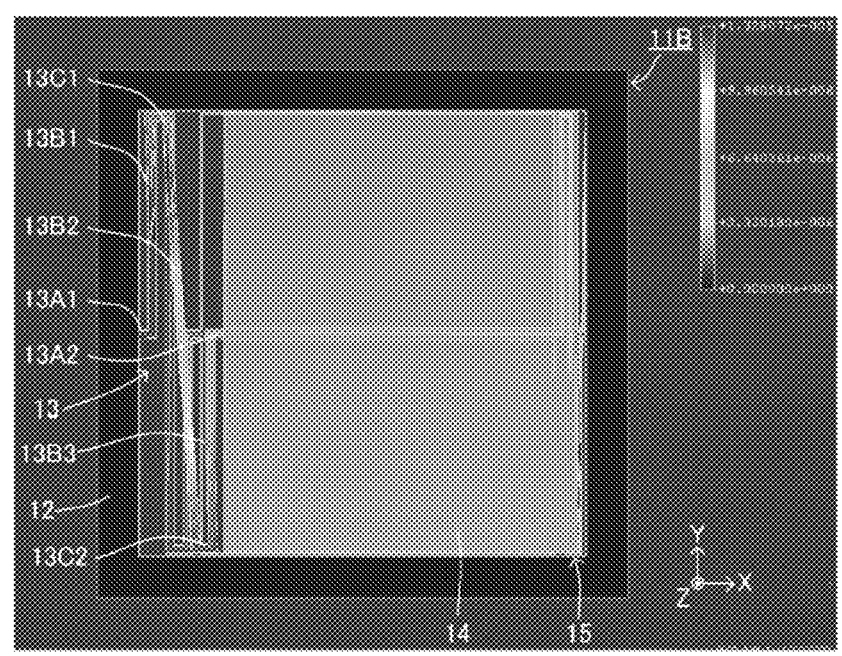
FIG. 5 is a contour figure representing deformation caused upon driving of an acceleration sensor device that constitutes an acceleration sensor according to EXAMPLE 2 of the first preferred embodiment of the present invention.

FIG. 5 is a contour figure representing displacement magnitudes at various points in the acceleration sensor device 11B, which constitutes the acceleration sensor of EXAMPLE 2, in the state where the vibrating beam 13 is driven and vibrated. In the vibration mode of the acceleration sensor device 11B, mainly the vibrating portions 13B1, 13B2 and 13B3 of the vibrating beam 13 are vibrated to flex in the X-axis direction. In the state illustrated in FIGS. 5A and 5B, the vibrating portion 13B1 is slightly flexed toward the negative direction side of the X-axis, and the region of the vibrating portion 13B2, which is located on the more positive side in the Y-axis direction than the center of the vibrating portion 13B2 in the lengthwise direction (i.e., in the Y-axis direction), is flexed toward the positive direction side of the X-axis. Furthermore, the region of the vibrating portion 13B2, which is located on the more negative side in the Y-axis direction than the center of the vibrating portion 13B2 in the lengthwise direction (i.e., in the Y-axis direction) is flexed toward the negative direction side of the X-axis, and the vibrating portion 13B3 is displaced to a large extent toward the positive direction side of the X-axis. Moreover, the fixation member 12 is hardly displaced, while the weight member 14 is displaced to a large extent in toward the positive direction side of the X-axis. The spacing between the fixation member-side connecting portion 15A1 and the weight member-side connecting portion 15A2 of the holding beam 15 in X-axis direction is narrowed.

The X-axis sensitivity of the acceleration sensor of EXAMPLE 2 was about 20 ppm/G. On the other hand, the X-axis sensitivity of the acceleration sensor of EXAMPLE 1 was about 292 ppm/G as described above. The X-axis sensitivity of the acceleration sensor of COMPARATIVE EXAMPLE 1 was about 1.46 ppm/G as described above. The X-axis sensitivity of the acceleration sensor of COMPARATIVE EXAMPLE 2 was about 2.9 ppm/G as described above.

Thus, the X-axis sensitivity of the acceleration sensor of EXAMPLE 2 was lower than that of the acceleration sensor of EXAMPLE 1, but it was sufficiently higher than those of the acceleration sensors of COMPARATIVE EXAMPLES 1 and 2. The reasons presumably reside in that the acceleration sensor of EXAMPLE 2 has the structure in which the weight member 14 is supported by the vibrating beam 13 and the holding beam 15 at two locations in total, and that the vibrating beam 13 is vibrated, though not in the point-symmetric vibration mode, in the vibration mode where the vibration occurs in the X-Y plane.

EXAMPLE 3

The acceleration sensor 1 according to the first preferred embodiment of the present invention will be described below in connection with non-limiting EXAMPLE 3. In the acceleration sensor of EXAMPLE 3, sizes of various portions of the vibrating beam 13 are set suitably based on the results of examining influences caused by those sizes of the vibrating beam 13 upon the sensitivity for acceleration in the X-axis direction.

Figure 6A:
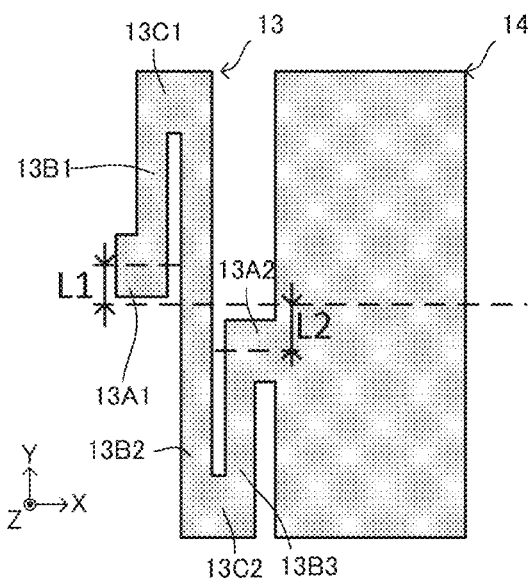
FIGS. 6A-6C are explanatory views to explain influences of dimensional setting in an acceleration sensor device that constitutes an acceleration sensor according to EXAMPLE 3 of the first preferred embodiment of the present invention.

FIG. 6 is an explanatory view to explain the case where respective center positions of the fixation member-side connecting portion 13A1 and the weight member-side connecting portion 13A2, both constituting the vibrating beam 13, in the Y-axis direction (hereinafter referred to as Y-axial connected positions) are offset from a center position of the weight member 14 in the Y-axis direction (hereinafter referred to as a Y-axial center position). As illustrated in FIG. 6A, the distance through which the Y-axial connected position of the fixation member-side connecting portion 13A1 is spaced from the Y-axial center position of the weight member 14 in the positive direction or the negative direction of the Y-axis is denoted by an offset amount L1, and the distance through which the Y-axial connected position of the weight member-side connecting portion 13A2 is spaced from the Y-axial center position of the weight member 14 in the positive direction or the negative direction of the Y-axis is denoted by an offset amount L2.

Figure 6B:
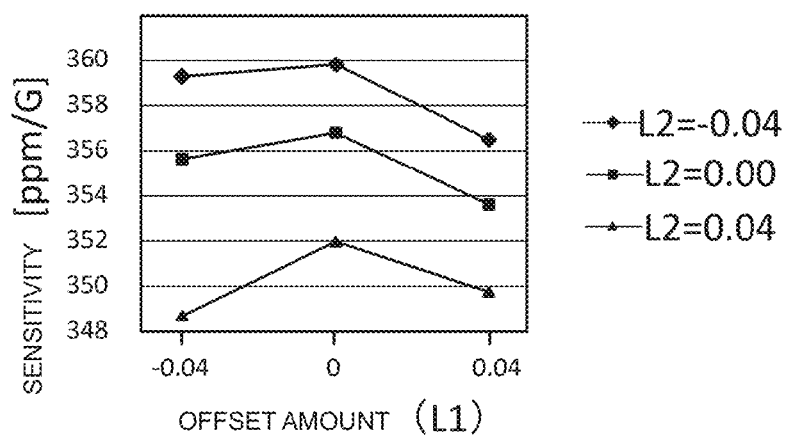

FIG. 6B plots the relation between the offset amount L1 and the X-axis sensitivity. As seen from FIG. 6B, the X-axis sensitivity is at maximum in the state where the offset amount L1 is substantially zero, i.e., the state where the Y-axial connected position of the fixation member-side connecting portion 13A1 is coincident with the Y-axial center position of the weight member 14. However, the X-axis sensitivity is reduced in the state where the offset amount L1 is 0.04, i.e., the state where the Y-axial connected position of the fixation member-side connecting portion 13A1 is offset toward the positive direction side of the Y-axis from the Y-axial center position of the weight member 14, and in the state where the offset amount L1 is −0.04, i.e., the state where the Y-axial connected position of the fixation member-side connecting portion 13A1 is offset toward the negative direction side of the Y-axis from the Y-axial center position of the weight member 14. Hence it is desired in the configuration of the vibrating beam that the Y-axial connected position of the fixation member-side connecting portion 13A1 is coincident with the Y-axial center position of the weight member 14.

Figure 6C:
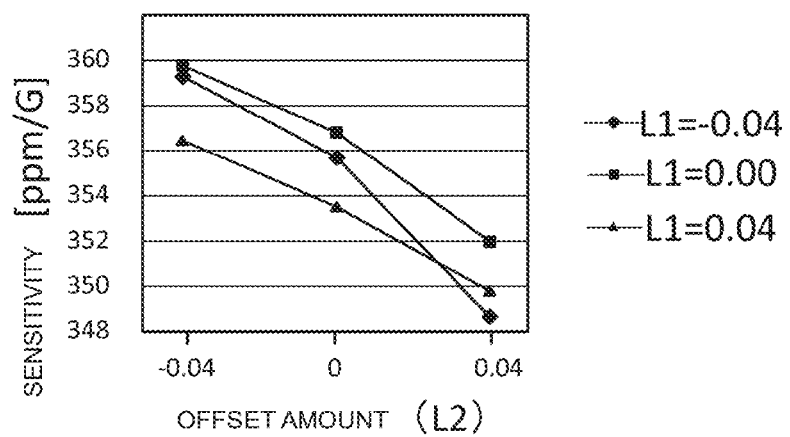

FIG. 6C plots the relation between the offset amount L2 and the X-axis sensitivity. As seen from FIG. 6C, the X-axis sensitivity is at maximum in the state where the offset amount L2 is −0.04, i.e., the state where the Y-axial connected position of the weight member-side connecting portion 13A2 is offset toward the positive direction side of the Y-axis from the Y-axial center position of the weight member 14. However, the X-axis sensitivity for acceleration in the X-axis direction is reduced in the state where the offset amount L2 is increased to and further to 0.04, i.e., the state where the Y-axial connected position of the weight member-side connecting portion 13A2 is offset toward the negative direction side of the Y-axis from the Y-axial center position of the weight member 14. Hence, regarding the offset amount L2, it is desired in the configuration of the vibrating beam that the Y-axial connected position of the weight member-side connecting portion 13A2 is offset toward the positive direction side of the Y-axis from the Y-axial center position of the weight member 14, i.e., that the Y-axial connected position of the weight member-side connecting portion 13A2 is offset in a direction in which the Y-axial size of the vibrating portion 13B3 connected to the weight member-side connecting portion 13A2 is increased.

Figure 7A:
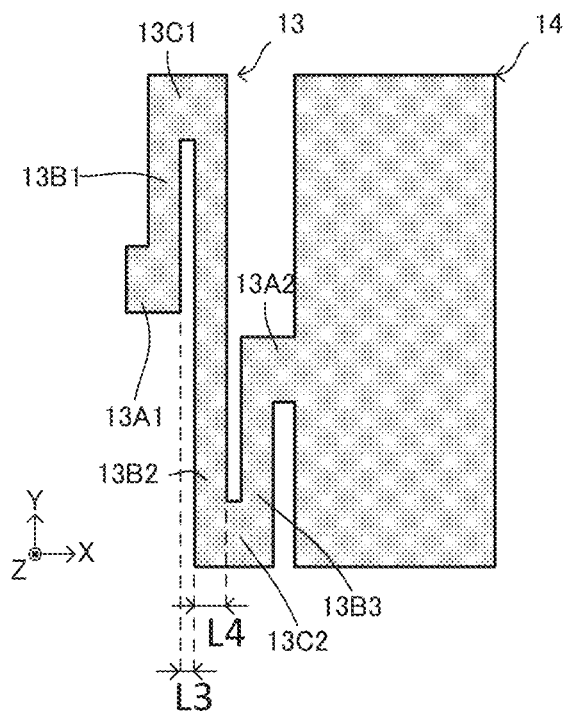
FIGS. 7A and 7B are explanatory views to explain influences of dimensional setting in the acceleration sensor device that constitutes the acceleration sensor according to EXAMPLE 3 of the first preferred embodiment of the present invention.

FIG. 7 is an explanatory view to explain the case where a ratio of the X-axial spacing between adjacent two of the vibrating portions 13B1, 13B2 and 13B3, which constitute the vibrating beam 13, to the X-axial width of each of the vibrating portions 13B1, 13B2 and 13B3 is changed. As illustrated in FIG. 7A, the X-axial spacing between the vibrating portion 13B1 and the vibrating portion 13B2 and the X-axial spacing between the vibrating portion 13B2 and the vibrating portion 13B3 are each denoted by a spacing L3, and the X-axial width of each of the vibrating portions 13B1, 13B2 and 13B3 is denoted by a width L4.

Figure 7B:
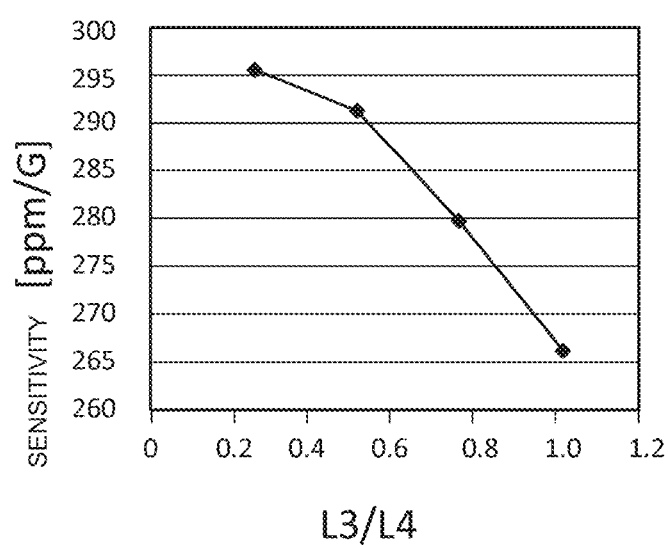

FIG. 7B plots the relation between the ratio L3/L4 of the spacing L3 to the width L4 and the X-axis sensitivity. As seen from FIG. 7B, the smaller the ratio L3/L4, i.e., the narrower the X-axial spacing between adjacent two of the vibrating portions 13B1, 13B2 and 13B3 in comparison with the X-axial width of each of the vibrating portions 13B1, 13B2 and 13B3, the higher is the X-axis sensitivity. The larger the ratio L3/L4, i.e., the wider the X-axial spacing between adjacent two of the vibrating portions 13B1, 13B2 and 13B3 in comparison with the X-axial width of each of the vibrating portions 13B1, 13B2 and 13B3, the lower is the X-axis sensitivity. Hence it is desired in the configuration of the vibrating beam that the X-axial spacing between adjacent two of the vibrating portions 13B1, 13B2 and 13B3 is smaller than the X-axial width of each of the vibrating portions 13B1, 13B2 and 13B3.

Figure 8A:
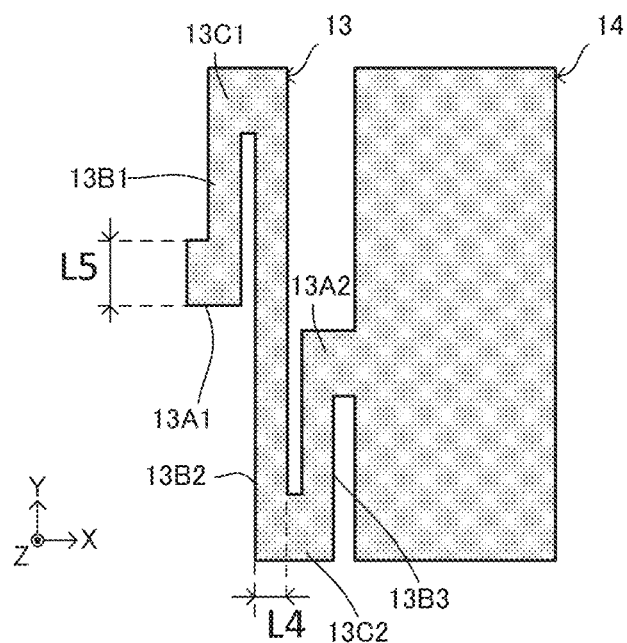
FIGS. 8A and 8B are explanatory views to explain influences of dimensional setting in the acceleration sensor device that constitutes the acceleration sensor according to EXAMPLE 3 of the first preferred embodiment of the present invention.

FIG. 8 is an explanatory view to explain the case where a ratio of the Y-axial width of each of the fixation member-side connecting portion 13A1 and the weight member-side connecting portion 13A2, both constituting the vibrating beam 13, to the X-axial width of each of the vibrating portions 13B1, 13B2 and 13B3 is changed. As illustrated in FIG. 8A, the Y-axial width of each of the fixation member-side connecting portion 13A1 and the weight member-side connecting portion 13A2 is denoted by a width L5. The X-axial width of each of the vibrating portions 13B1, 13B2 and 13B3 is denoted by a width L4 as in the above-described case.

Figure 8B:
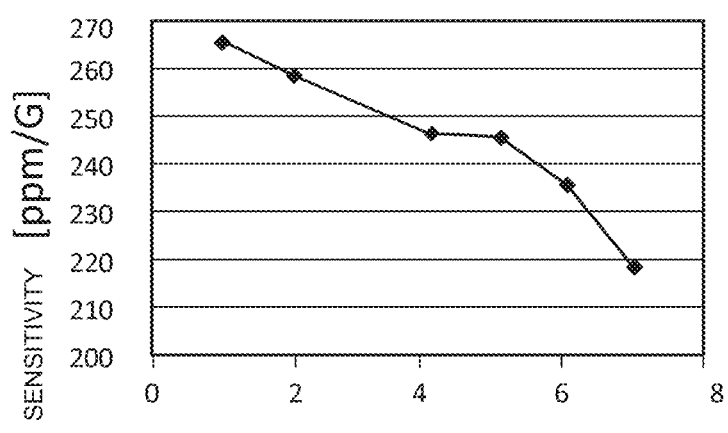

FIG. 8B plots the relation between the ratio L5/L4 of the width L5 to the width L4 and the X-axis sensitivity. As seen from FIG. 8B, the smaller the ratio L5/L4 in a plotted ratio range, i.e., the narrower the Y-axial width of each of the fixation member-side connecting portion 13A1 and the weight member-side connecting portion 13A2 in ratio relative to the X-axial width of each of the vibrating portions 13B1, 13B2 and 13B3, the higher is the X-axis sensitivity. The larger the ratio L5/L4 in the plotted ratio range, i.e., the wider the Y-axial width of each of the fixation member-side connecting portion 13A1 and the weight member-side connecting portion 13A2 in comparison with the X-axial width of each of the vibrating portions 13B1, 13B2 and 13B3, the lower is the X-axis sensitivity. Hence it is desired in the configuration of the vibrating beam that the Y-axial width of each of the fixation member-side connecting portion 13A1 and the weight member-side connecting portion 13A2 is equal to the X-axial width of each of the vibrating portions 13B1, 13B2 and 13B3.

As understood from the above descriptions, the acceleration sensor of EXAMPLE 3 is preferably configured such that the Y-axial connected position of the fixation member-side connecting portion 13A1 is coincident with the Y-axial center position of the weight member 14, and that the Y-axial connected position of the weight member-side connecting portion 13A2 is offset from the Y-axial center position of the weight member 14 toward the positive direction side of the Y-axis, i.e., in the direction in which the Y-axial size of the vibrating portion 13B3 connected to the weight member-side connecting portion 13A2 is increased. Furthermore, preferably, the X-axial spacing between adjacent two of the vibrating portions 13B1, 13B2 and 13B3 is preferably smaller than the X-axial width of each of the vibrating portions 13B1, 13B2 and 13B3. In addition, preferably, the Y-axial width of each of the fixation member-side connecting portion 13A1 and the weight member-side connecting portion 13A2 is preferably equal or substantially equal to the X-axial width of each of the vibrating portions 13B1, 13B2 and 13B3.

With the above-described configurations, the acceleration sensor of EXAMPLE 3 provides the X-axis sensitivity at a very high level.

EXAMPLE 4

The acceleration sensor 1 according to the first preferred embodiment of the present invention will be described below in connection with non-limiting EXAMPLE 4. The acceleration sensor of EXAMPLE 4 includes a driver different from that in the acceleration sensor device 11 of the acceleration sensor according to the first preferred embodiment.

Figure 9:
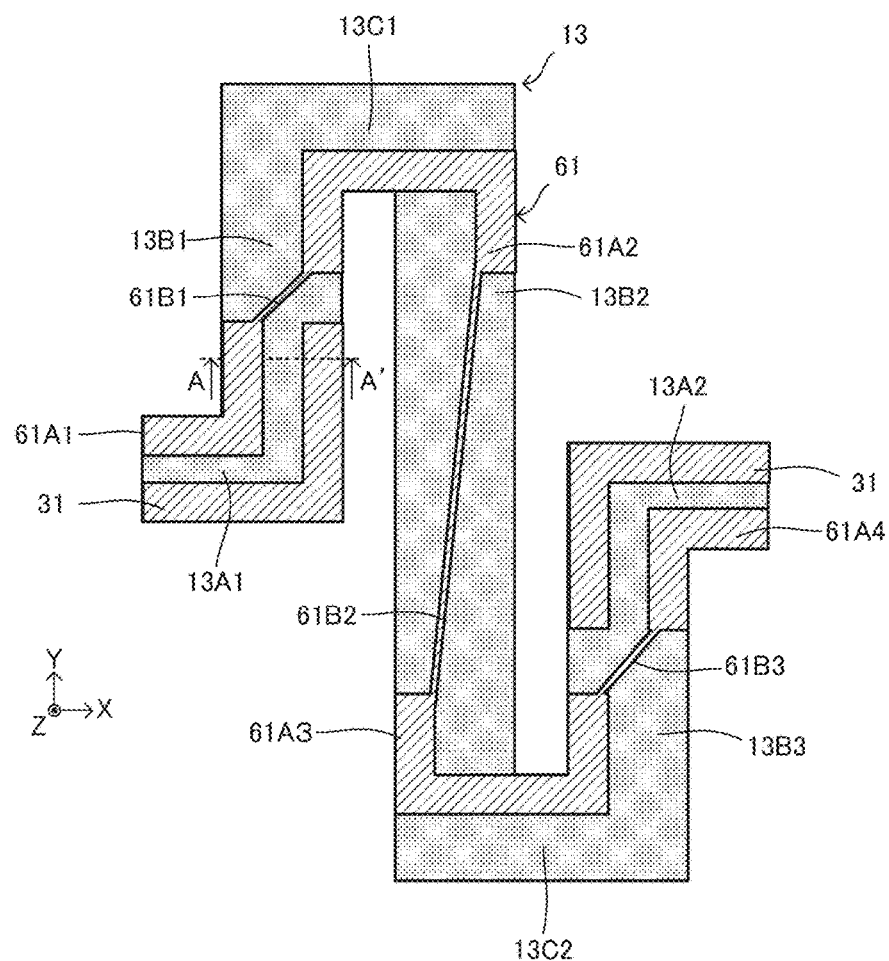
FIG. 9 is a schematic view to explain configurations of a vibrating beam, a driver, and a detector in an acceleration sensor device that constitutes an acceleration sensor according to EXAMPLE 4 of the first preferred embodiment of the present invention.

FIG. 9 is a plan view, looking at an X-Y plane, of the vibrating beam 13 in the acceleration sensor of EXAMPLE 4.

A driver 61 and detectors 31 are disposed on the upper surface of the vibrating beam 13 (i.e., on the positive direction side of the Z-axis). The driver 61 is disposed in a point-symmetric shape in the X-Y plane with the center point of the vibrating beam 13 being a reference. The driver 61 preferably includes four band-shaped portions 61A1, 61A2, 61A3 and 61A4, and three connecting portions 61B1, 61B2 and 61B3, for example. More specifically, in and near or adjacent to the fixation member-side connecting portion 13A1 of the vibrating beam 13, the band-shaped portion 61A1 preferably has an L-shaped or substantially L-shaped configuration, when looked at in a plan view, to extend from a region of the fixation member-side connecting portion 13A1 on the positive direction side of the Y-axis to a region of the vibrating portion 13B1 on the negative direction side of the X-axis and on the negative direction side of the Y-axis.

In and near or adjacent to the vibrating portion 13C1 of the vibrating beam 13, the band-shaped portion 61A2 preferably has a C-shaped or substantially C-shaped configuration, when looked at in a plan view, to extend from a region of the vibrating portion 13B1 on the positive direction side of the X-axis and on the positive direction side of the Y-axis, to a region of the vibrating portion 13C1 on the negative direction side of the Y-axis, and farther to a region of the vibrating portion 13B2 on the positive direction side of the X-axis and on the positive direction side of the Y-axis. The band-shaped portion 61A2 is connected to the band-shaped portion 61A1 by the connecting portion 61B1.

In and near or adjacent to the vibrating portion 13C2 of the vibrating beam 13, the band-shaped portion 61A3 preferably has a C-shaped or substantially C-shaped configuration, when looked at in a plan view, to extend from a region of the vibrating portion 13B2 on the negative direction side of the X-axis and on the negative direction side of the Y-axis, to a region of the vibrating portion 13C2 on the positive direction side of the Y-axis, and further to a region of the vibrating portion 13B3 on the negative direction side of the X-axis and on the negative direction side of the Y-axis. The band-shaped portion 61A3 is connected to the band-shaped portion 61A2 by the connecting portion 61B2.

In and near the weight member-side connecting portion 13A2, the band-shaped portion 61A4 preferably has an L-shaped or substantially L-shaped configuration, when looked at in a plan view, to extend from a region of the weight member-side connecting portion 13A2 on the negative direction side of the Y-axis to a region of the vibrating portion 13B3 on the positive direction side of the X-axis and on the positive direction side of the Y-axis. The band-shaped portion 61A4 is connected to the band-shaped portion 61A3 by the connecting portion 61B3.

As described above, the vibrating beam 13 has the point-symmetric shape in the X-Y plane with its center point being a reference. Furthermore, the driver 61 and the detectors 31 also have the point-symmetric shapes in the X-Y plane with the center point of the vibrating beam 13 being a reference. Thus, since the shape of the vibrating beam 13 and the layout of the driver and the detectors are point-symmetric, the vibrating beam 13 is vibrated in a point-symmetric vibration mode when the driver 61 is driven. Moreover, since the driver 61 has a larger volume than the drivers 21, each of which has the shape illustrated in FIG. 2B, corresponding to the presence of the band-shaped portions 61A2 and 61A3, the amplitude of the vibration of the vibrating beam 13 in the point-symmetric vibration mode is increased.

The acceleration sensor according to various preferred embodiments of the present invention can be constituted as described above with respect to the preferred embodiments and EXAMPLES thereof. It is to be noted that the foregoing description is merely illustrative, and that the acceleration sensor of the present invention can be realized in various forms modified as appropriate within the scope defined in the claims. For instance, while the foregoing description is made in connection with an example in which the piezoelectric layer and the lower electrode layer preferably are disposed only in the regions where the driver and the detector are disposed, the piezoelectric layer and the lower electrode layer may be disposed over the entire surface of the vibrating beam, and the driver and the detector may be each constituted depending on whether the upper electrode layer is disposed or not. Furthermore, while the vibrating beam preferably is vibrated in the point-symmetric vibration mode in a preferable example, the layout of the driver and the detector, which can realize that vibration mode, is not limited to the above-described layout. Acceleration sensors according to various preferred embodiments of the present invention can be realized in other various forms as well.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An acceleration sensor comprising:
   a fixation member;
   a weight member including two sides opposite to each other in a first direction when looked at in a plan view;
   a vibrating beam including a first end portion connected at one location to the fixation member and a second end portion connected at one location to one of the two sides of the weight member opposite to each other in the first direction when looked at in a plan view, the vibrating beam supporting the weight member to be displaceable in the first direction;
   a holding beam including a first end portion connected at one location to the fixation member and a second end portion connected at one location to the other of the two sides of the weight member opposing to each other in the first direction when looked at in a plan view, the holding beam supporting the weight member to be displaceable in the first direction;
   a driver disposed on the vibrating beam and vibrating the vibrating beam; and
   a detector disposed on the vibrating beam and configured to output a detection signal that changes according to deformation of the vibrating beam; wherein
   at the one of the two sides of the weight member opposite to each other in the first direction when looked at in a plan view, the weight member is connected to the fixation member by only the vibrating beam and the weight member is supported at only one location;
   at the other of the two sides of the weight member opposite to each other in the first direction when looked at in a plan view, the weight member is connected to the fixation member by only the holding beam and the weight member is supported at only one location; and
   the weight member is supported at a total of only two locations.

2. The acceleration sensor according to claim 1, wherein the vibrating beam is vibrated by the driver in a point-symmetric vibration mode.

3. The acceleration sensor according to claim 1, wherein the vibrating beam has a meander shape zigzagging with respect to the first direction and a point-symmetric shape with a center point thereof being a reference, the vibrating beam including a weight member-side connecting portion that extends in the first direction from a connected position between the vibrating beam and the weight member, a fixation member-side connecting portion that extends in the first direction from a connected position between the vibrating beam and the fixation member, and a vibrating portion connected between the weight member-side connecting portion and the fixation member-side connecting portion and that extends in a second direction perpendicular or substantially perpendicular to the first direction;

the holding beam includes a weight member-side connecting portion that extends in the first direction from a connected position between the holding beam and the weight member, a fixation member-side connecting portion that extends in the first direction from a connected position between the holding beam and the fixation member, and a vibrating portion connected between the weight member-side connecting portion and the fixation member-side connecting portion and that extends in the second direction; and the vibrating portion connected to the weight member-side connecting portion in the holding beam and the vibrating portion connected to the weight member-side connecting portion in the vibrating beam extend in opposite directions.

4. The acceleration sensor according to claim 1, wherein the vibrating beam includes a fixation member-side connecting portion that extends in the first direction from a connected position between the vibrating beam and the fixation member; and a center position of the fixation member-side connecting portion of the vibrating beam in the second direction is coincident with a center position of the weight member in the second direction.

5. The acceleration sensor according to claim 1, wherein the vibrating beam includes a weight member-side connecting portion that extends in the first direction from a connected position between the vibrating beam and the weight member, a fixation member-side connecting portion that extends in the first direction from a connected position between the vibrating beam and the fixation member, and a vibrating portion connected between the weight member-side connecting portion and the fixation member-side connecting portion and that extends in a second direction perpendicular or substantially perpendicular to the first direction; and a center position of the weight member-side connecting portion of the vibrating beam in the second direction is offset from a center position of the weight member in a direction in which a size of the vibrating portion of the vibrating beam connected to the weight member-side connecting portion of the vibrating beam in the second direction is increased.

6. The acceleration sensor according to claim 1, wherein the vibrating beam includes a plurality of vibrating portions, and a spacing between two adjacent ones of the plurality of vibrating portions in the first direction is smaller than a width of each of the plurality of vibrating portions in the first direction.

7. The acceleration sensor according to claim 1, wherein the vibrating beam includes a fixation member-side connecting portion that extends in the first direction from a connected position between the vibrating beam and the fixation member, a weight member-side connecting portion that extends in the first direction from a connected position between the vibrating beam and the weight member, and a plurality of vibrating portions; and in the vibrating beam, a width of each of the fixation member-side connecting portion and the weight member-side connecting portion in the second direction is equal or substantially equal to a width of each of the plurality of vibrating portions in the first direction.

8. The acceleration sensor according to claim 1, wherein the fixation member has an external shape that is a rectangular or substantially rectangular frame.

9. The acceleration sensor according to claim 1, wherein the weight member includes a substantially quadrangular plate.

10. The acceleration sensor according to claim 1, wherein respective centers of the fixation member, the vibrating beam, the weight member, and the holding beam in an X-Y plane are arranged to lie on an X-axis.

11. The acceleration sensor according to claim 1, wherein each of the vibrating beam and the holding beam has resiliency and is configured to expand and contract in an X-axis direction.

12. The acceleration sensor according to claim 1, wherein each of the driver and the detector includes a lower electrode layer provided on the vibrating beam at an upper surface side, a piezoelectric layer provided on the lower electrode layer, and an upper electrode layer provided on the piezoelectric layer.

13. The acceleration sensor according to claim 1, wherein the driver includes a plurality of band-shaped portions and a plurality of connecting portions.

14. The acceleration sensor according to claim 13, wherein the band-shaped portions are one of L-shaped, substantially L-shaped, C-shaped and substantially C-shaped.

15. The acceleration sensor according to claim 1, wherein each of the vibrating beam, the driver and the detector has a point-symmetric shape with a center point thereof being a reference.

* * * * *